United States Patent [19]

Katz

[11] Patent Number: 5,131,774
[45] Date of Patent: Jul. 21, 1992

[54] APPLICATOR PEN FOR LIQUIDS

[75] Inventor: Otto Katz, Schwabach, Fed. Rep. of Germany

[73] Assignee: Georg Karl Geka-Brush GmbH, Bechhofen-Waizendorf, Fed. Rep. of Germany

[21] Appl. No.: 634,167

[22] PCT Filed: Jun. 13, 1989

[86] PCT No.: PCT/EP89/00665
§ 371 Date: Dec. 17, 1990
§ 102(e) Date: Dec. 17, 1990

[87] PCT Pub. No.: WO89/12411
PCT Pub. Date: Dec. 28, 1989

[30] Foreign Application Priority Data

Jun. 16, 1988 [DE] Fed. Rep. of Germany ....... 3820450

[51] Int. Cl.$^5$ .............................................. A46B 11/02
[52] U.S. Cl. ....................................... 401/99; 401/101;
401/115; 401/151; 401/274
[58] Field of Search ................. 401/99, 101, 102, 151,
401/274, 115

[56] References Cited

U.S. PATENT DOCUMENTS

| | | | |
|---|---|---|---|
| 2,547,287 | 4/1951 | Sanders et al. | 401/99 X |
| 2,630,593 | 3/1953 | Jockers | 401/274 X |
| 3,420,611 | 1/1969 | Towns | 401/99 X |
| 3,827,813 | 8/1974 | Stryczek | 401/151 |
| 4,773,785 | 9/1988 | Katz | 401/99 X |
| 4,838,722 | 6/1989 | Katz | 401/101 |

FOREIGN PATENT DOCUMENTS 3629627 1/1988 Fed. Rep. of Germany .
8700404 1/1987 World Int. Prop. O. .

Primary Examiner—Steven A. Bratlie
Attorney, Agent, or Firm—Browdy and Neimark

[57] ABSTRACT

An application pen for liquids, which are supplied in metered amounts from a reservoir to an application element with the aid of an actuating element, which together with an actuating element and a metering piston is moveable in the direction of the longitudinal axis and is insertable into a bore. Between the bore for an application element and a reservoir a metering chamber is disposed, having at its ends seals, wherein the longitudinal distance of the sealing lips from each other is greater than the distance of a control edge of a lower piston to a control edge of an upper piston and wherein the connection area of the lower piston and the upper piston is smaller in diameter than the lower piston and the upper piston and wherein these have different diameters.

7 Claims, 2 Drawing Sheets

FIG. 1
FIG. 2
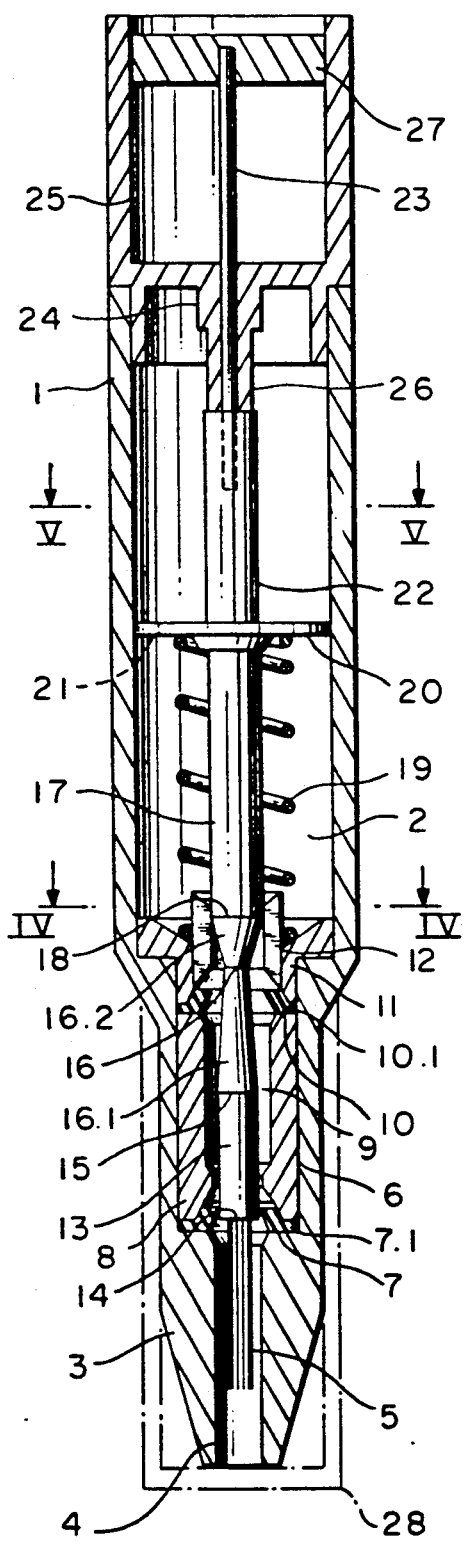
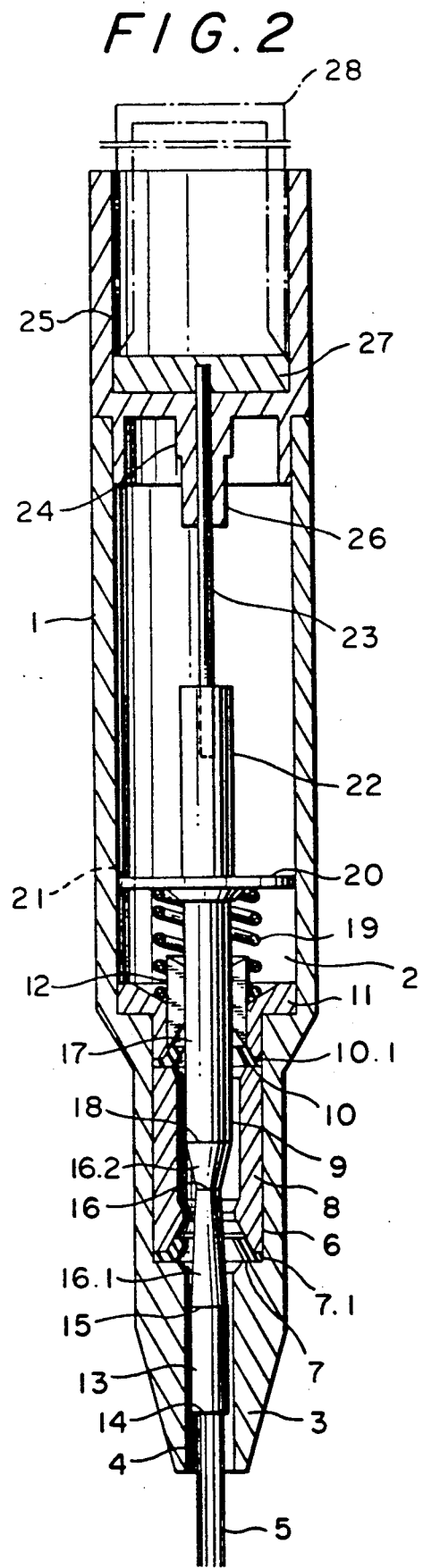

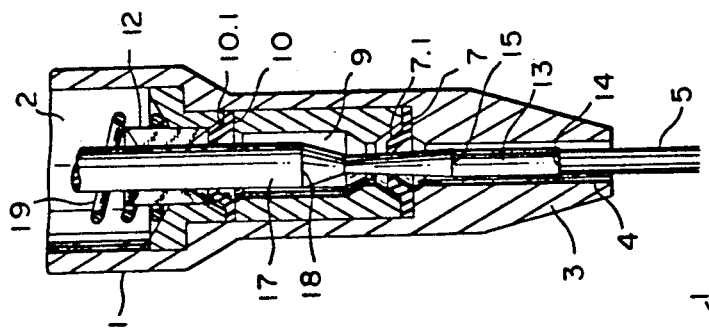
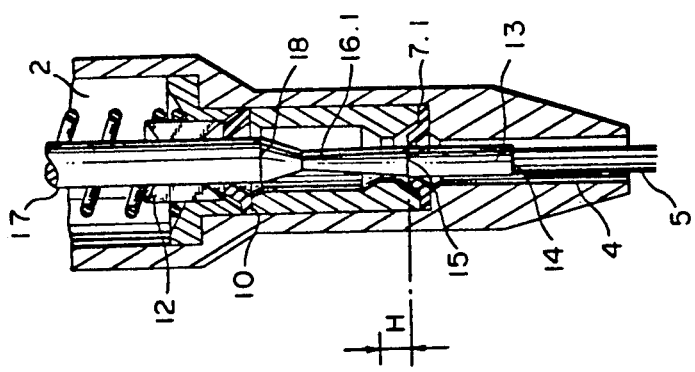
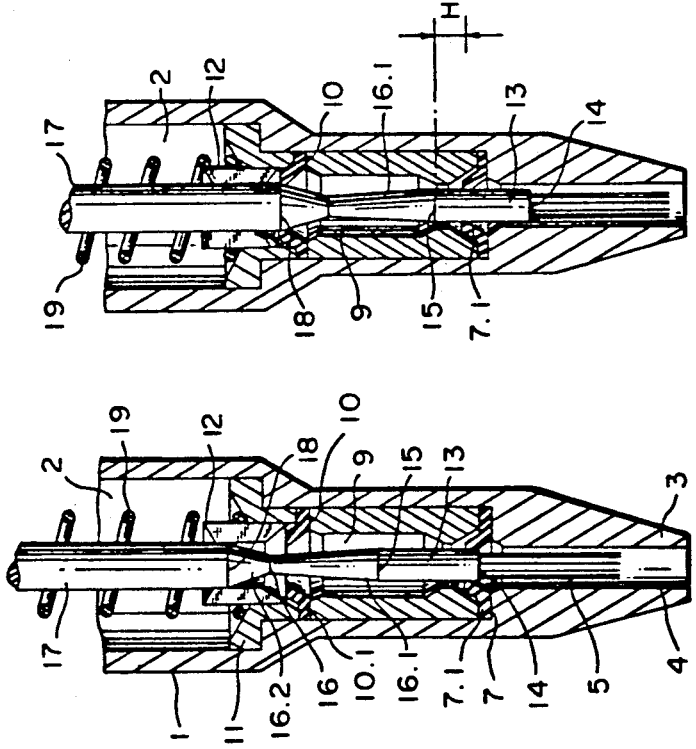
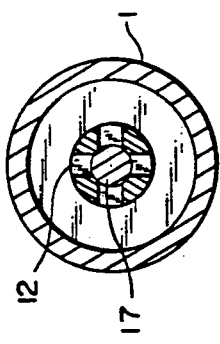

APPLICATOR PEN FOR LIQUIDS

BACKGROUND OF THE INVENTION

The invention relates to an applicator pen for liquids.

The applicator pen for liquids contains an applicator element in the shape of a brush or wick which, in the position of rest, is retracted into the bore of a nozzle and which can be brought into the position of use against the force of a pressure spring by means of an actuating element. In the course of operation the applicator element is wetted with liquid from the reservoir in a metered manner. At the end of its use or after release of the activation element, the applicator element is returned into the initial position, where the applicator element is protected from quick drying out and damage.

A pen-like device is known from German Letters Patent DE-PS 36 29 627 which, similar to the present invention, supplies a brush-like applicator element with liquid in a metered manner when the brush has been brought into the position of use by means of an activation element.

However, the structure of the metering system and its function differ from those of the invention.

In the prior art design the metering operation is the result of the cooperation between a control piston, fixedly connected with the piston rod, and a resiliently attached metering piston which is axially movable on the piston rod. After the control piston has left its associated seal at the start of its longitudinal movement, the control piston, which is pre-stressed by a metering spring, is in a position to move into the sealing cylinder and to displace the liquid.

The resilient connection by means of the metering spring has the disadvantage that metering, i.e. the movement of the metering piston, depends on the friction of the metering piston in the sealing cylinder. With increased friction the metering piston initially remains stationary during operation until the metering spring has achieved pre-stressing which overcomes the static friction of the metering piston. This pre-stress build-up has the result that the metering piston is suddenly placed into sliding friction. Because of this the metered amount present in the metering chamber is displaced suddenly and uncontrolled out of the metering chamber.

The liquid leaves the nozzle in an undesirable manner. Because of this, even wetting of the applicator element does not take place and useful application is not possible.

Just as disadvantageous a result is created if in the known design the friction between metering piston and piston rod is too great. In this case the metering piston is taken along at the speed of actuation, so that in case of rapid actuation a metering pulse takes place which also results in an uncontrolled expulsion of liquid particles.

It is furthermore disadvantageous that operation becomes stiff because of increased friction between the metering piston and the piston rod and that the return spring is no longer able to return the piston rod with the metering piston into the initial position. Because of this the metering piston remains in the sealing cylinder, so that the metering chamber cannot be filled for the following metering step and application becomes impossible.

A further disadvantage of the prior art in comparison with the invention, is the need to produce an increased amount of parts having very close tolerances to achieve useful application.

SUMMARY OF THE INVENTION

It is the object of the invention to conceptualize an application pen for liquids in such a way that metering takes place dependably, free of sudden spurts and with small effort and that an efficient execution can be achieved with a few, simply designed and easily assembled parts.

To attain this object an applicator pen for liquids of the above described type has been designed.

A step piston consisting of a lower piston and an upper piston, the upper piston having the larger diameter, cooperates with two seals disposed on both ends of a metering chamber. A metering function with a minimum of movable parts which would need to be sealed is accordingly produced. This results from the difference in the diameters of the lower and upper cylinders and from a metering stroke.

It is furthermore advantageous in this connection that an overlap is created in the course of the stroke movement because of the greater amount of distance of the sealing lips in respect to the distance of the control edges disposed on the lower and upper cylinders. This it is achieved in a simple manner when the lower cylinder leaves the associated sealing lip only after the upper cylinder has already been grasped at its control edge by its associated sealing lip. Thus, unintentional loss of filler material is prevented with greater assurance when higher pressure prevails in the reservoir, for example because of increased temperature.

In accordance with an advantageous embodiment the connection between the lower and upper pistons is smaller in diameter than that of the lower piston. Because of this, the sealing lips can permit or deny the flow of liquid in a defined manner at the control edges of the lower and upper cylinders.

In this embodiment it is advantageous to divide the connection between the lower and upper cylinders into two conical sections. The cone following the lower cylinder is of particular importance, because its conical shape creates a flow-through cross section which opens slowly after the control edge of the lower piston has penetrated the associated seal. The results in a damped tension release of the liquid under pressure in the metering chamber. For this reason it is advantageous to make the conical shape following the lower piston particularly long and with a small cone angle. In this way the annular gap formed by the sealing lip and the conical section is only slowly enlarged. In connection with the geometrical design of the seals it is practical that their sealing lips extend conically in the axial direction and that they taper in the direction towards the reservoir. When there is an overpressure in the reservoir the seals increase their pressure on the lower and upper cylinders, because their sealing effect is increased. If in contrast thereto underpressure is created in the reservoir because of delivery of an amount of liquid, the balance of air required for the metering function is aided by the breathing function of the sealing lips.

It is furthermore advantageous that a retarding disk is fastened on the end of the upper piston, which at the same time is used for supporting the pressure spring and which is advantageously guided on the inside wall of the housing, so that there is little overflow over the periphery of the retarding disk in order to achieve a defined flow of liquid in its passages.

By means of this a defined control pressure can be achieved which assists the filling of the metering chamber during the forward stroke, while the suction created during the backward stroke aids the air balance in the reservoir.

The retarding disk provides a further advantage by preventing the tendency towards kinking of the long rod structure, formed by stringing together the lower and upper pistons, the shaft and the actuating rod.

In the course of designing the actuating rod it is furthermore advantageous to reduce its diameter in respect to the upper piston to such an degree that it is just sufficient to be kink-resistant. This results in the upper piston, together with the actuating rod, forming a second, very effective step piston in the opposite orientation inside the reservoir. During the actuation stroke this results in the generation of underpressure because of the delivery of material and additional underpressure by means of the step piston. This assists the breathing function of the sealing lip associated with the upper piston, which controls the air balance to the reservoir.

Keeping the diameter of the actuating rod small further permits miniaturization of the seal between the actuating rod and the reservoir which reduces sealing losses.

In this connection it is advantageous to make the actuating rod of metallic material in order to achieve a high degree of kink resistance and to achieve low friction values by means of a smooth surface.

An exemplary embodiment of the invention is shown in the drawings and will be described in detail below.

BRIEF DESCRIPTION OF THE DRAWINGS

FIG. 1 shows a longitudinal section through the non-actuated application pen,

FIG. 2 shows a longitudinal section through the actuated application pen,

FIG. 3 shows four actuation positions a to d,

FIG. 4 shows a cross section IV—IV through the non-actuated application pen,

FIG. 5 shows a cross section V—V through the non-actuated application pen.

PREFERRED EMBODIMENTS OF THE INVENTION

The structure of the application pen for liquids is as follows:

A reservoir 2 to receive the liquid, which is to be applied, but is not shown, is located in a housing 1. The housing 1 is connected with a nozzle 3 having a bore 4 to receive the longitudinally displaceable application element 5. The bore 6 which follows the bore 4 contains a seal 7, a bush 8 and, following it, a seal 10. The seals 7 and 10 are provided with sealing lips 7.1 and 10.1. The bush 8 is used for spacing the seals 7 and 10 and forms a metering chamber 9 on its interior diameter. Compared with the seal 7, the seal 10 has an enlarged interior diameter. The seals 7 and 10, together with the bush 8, are axially fixed by means of a flanged bush 11, which abuts the inside of the housing 1 by means of a pressure spring 19. The flanged bush 11 contains longitudinal conduits 12 which are used for the flow-through of the liquid from the reservoir 2 into the metering chamber 9.

The step piston consists of a lower piston 13 and an upper piston 17. Both are connected by means of conical sections 16.1 and 16.2, which form the connection 16. The lower piston 13 has the lesser diameter and extends from a front edge 14 to a control edge 15 and is grasped in this area by the seal 7. The upper piston 17 is guided and centered on the inner diameter of the longitudinal conduits 12 and extends from the control edge 18 to a retarding disk 20. Under the influence of the pressure spring 19, the step cylinder formed by the lower piston 13 and the upper piston 17 takes up the position shown in FIG. 1. The pressure spring is supported on one side on the flanged bush 11 and on the other side on the retarding disk 20, the initial position in the axial direction being determined by the seat of a shaft 22 against the front end of the seal 26.

The retarding disk 20 is fixedly connected with the upper piston 17, is guided on the inner wall of the housing 1 and has openings 21. In the course of longitudinal movement, the latter cause a throttled flow of the liquid and generate dynamic pressure between the metering chamber 9 and the retarding disk 20.

The shaft 22 adjoins the retarding disk 20 and is fixedly connected with the lower piston 13, with the upper piston 17 as well as with the actuating rod 23. The latter is guided, movable in the longitudinal direction, in a bearing 24 and a seal 26. The latter is connected with the front end of the bearing 24 and seals the reservoir 2 in the direction of the actuating side. The bearing 24 is formed on a end bush 25 which is tightly connected with the housing 1 and at the same time receives an actuating element 27. The latter is connected with the actuating rod 23, which is made of a metallic material. By means of this the least possible diameter is achieved in order to keep friction or sealing losses at a minimum.

The application pen is closed in a known manner with a cap 28. In accordance with FIG. 2 it can be transferred to the actuating element 27.

The mode of operation will be described below.

Manipulation of the application pen for liquids is performed in a simple manner in that the spring-loaded actuating element 27 is pushed down by means of the cap 28 and the application element 5 is brought into the operating position (FIG. 2). The cap 28 is actuated until application has taken place. When releasing the actuating element 27, the application element returns into the initial position (FIG. 1). Together with the depression of the actuating element 27 against the force of the spring in the direction of the nozzle 3, a metering step is triggered which wets the application element 5 with each actuation stroke.

For improved understanding of the function the longitudinal movement caused by actuation into the position of use as well as the return movement occurring with release of the actuating element into the initial position have been divided into individual stages. (FIGS. 3a to d).

Stage a-b

It is assumed that the reservoir 2, the metering chamber 9 and the annular chamber, formed of the bore 4 and the application element 5 or the lower piston 13, are already filled with the liquid.

During the longitudinal movement of the lower piston 13 and the upper piston 17 connected with it from position a to position b, the metering chamber 9 is connected with the reservoir 2 until the control edge 18 is tangent to the sealing lip 10.1. In the course of this the sealing lip 7.1 continuously lies against the lower piston 13. Because of the displacement of the lower piston 13, the liquid present in the annular chamber between the bore 4 and the application element 5 moves forward at the same time as the application element and keeps it wetted. The retarding disk 20 connected with the upper piston 17 causes dynamic pressure during the movement in the direction of the nozzle 3, which assists the filling of the metering chamber 9.

Stage b-c

In the position b the connection between the reservoir 2 and the metering chamber 9 is resealed by the control edge 18 and the sealing lip 10.1. The lower piston 13 as well as the upper piston 17 lie against their associated sealing lips 7.1 and 10.1 at the same time. In the course of the continued movement of the lower and upper pistons 13 and 17 in the direction towards the nozzle 3 or the position c, pressure builds up in the metering chamber 9, which is closed on all sides and filled, because of the difference in diameter between the lower piston 13 and the upper piston 17 and of the metering stroke H. Since the liquid is not compressible, the pressure is transferred to the small gas bubbles contained in the liquid and to the flexible seals 7 and 10. At this time the wetting of the application element 5 remains unchanged.

Stage c-d

In the course of the continued movement of the lower piston 13 and the upper piston 17 beyond the metering stroke H, the control edge 15 leaves the sealing lip 7.1. Therefore an increasingly larger annular opening forms between the sealing lip 7.1 and the conical section 16.1, through which the overpressure present in the metering chamber 9 is reduced in a throttled flow of liquid. This amount of liquid, which results from the difference in diameter between the lower and upper piston 13 and 17 and from the metering stroke H, represents the actual metered amount. A further push of the liquid results from the continued displacement of the upper piston 17 displacing its own volume, which is leaving the seal 10, until the end of the stroke in the position d. However, this amount is aspirated back during the return from position d to c, unless a small portion of it is held back by capillary action in the area of the application element 5 and this missing amount is replaced by entering air.

To sum up it should be stated that from position c to d the application element 5 is provided with a metered amount which is the result of the difference in diameter between the lower and the upper piston 13 and 17 and of the metering stroke H. In stages c-d and d-c, a forward and backward movement of the upper piston 17 is superimposed on the amount of liquid pulsing forward and backward.

By means of this, the application element 5 is additionally washed and wetted in an advantageous manner for the application taking place in position d.

Return into the initial position a.

Stage d-c

In position d the lower and upper piston 13 and 17 are in their forward end position. Because the upper piston 17 together with the actuating rod 23 forms a second step piston with reversed orientation, which acts towards the reservoir 2, maximum underpressure reigns in the reservoir 2 during the position d, which is the result of adding the continuing removal of material to the effect of the above mentioned step piston. Thus, in position d maximum underpressure is present at the sealing lip 10.1 at the side facing the reservoir 2, while the other side of the sealing lip is exposed to ambient pressure. This pressure drop at the seal 10 causes a breathing effect in the sealing lip 10.1, because of which compensating air flows into the reservoir 2 in order to balance the lack of material. The backwards movement of the upper piston 17 in the direction towards position c causes a backward aspiration of liquid from the bore 4 in the metering chamber 9. To the extent that liquid particles are retained by capillary action in the area of the application element 5, the lacking amount is supplemented by small air bubbles, so that in position c the metering chamber 9 has been filled with liquid which is mixed with a small amount of air.

The retarding disk 20 connected with the upper piston 17 creates suction in the area of the flanged bush 11 during the return from position d to c, by means of which the previously mentioned air-balance is additionally assisted.

Stage c-b

During the return from position c to b the sealing lips 7.1 and 10.1 simultaneously lie against the associated lower and upper piston 13 and 17 long enough so that the metering stroke H has been traversed backwards. The difference in diameter between lower and upper piston 13 and 17 and the stroke H result in an increase of material in the metering chamber 9, which cannot be compensated because of the adhering sealing lips 7.1 and 10.1 and therefore creates underpressure, which reaches its maximum value at position b.

Stage b-a

When the control edge 18 of the upper piston 17 leaves the sealing lip 10.1, the underpressure in the metering chamber 9 causes its balance by means of a flow of liquid from the reservoir 2.

This balance is assisted in that the upper piston 17, in connection with the actuating rod 23, also forms a step piston, which during the return from position c to b causes a pressure increase in the reservoir 2. The metering chamber 9 is now filled for a new metering step.

The annular chamber, filled with liquid and formed by the bore 4 and the application element 5, is emptied during the entire backward stroke from position d to a by the suction effect of the upper piston (position d-b) and of the lower piston (position c-a). Dripping is prevented by means of this when the application pen has been returned into its initial position.

I claim:

1. An application-pen for liquids, which are supplied in metered amounts from a reservoir to an application element with the aid of an actuating element, which together with the actuating element and a metering piston is movable in the direction of the longitudinal axis and is insertable into a bore, characterized in that
   between the bore (4) for an application element (5) and the reservoir (2) a metering chamber (9), having at its ends seals (7) and (10), is disposed and that the longitudinal distance of the sealing lips (7.1) and (10.1) from each other is greater than the distance of a control edge (15) on the lower piston (13) to a control edge (18) on the upper piston (17), and that the connection (16) is smaller in diameter than the lower piston (13) and the upper piston (17), which have different diameters.

2. An application pen in accordance with claim 1, characterized in that
   the connection (16) from the lower piston (13) to the upper piston (17) consists of two conical sections (16.1) and (16.2).

3. An application pen in accordance with claim 2 characterized in that the conical section (16.1) which follows the lower piston (13) has the shape of a truncated cone, the length of which is greater than that of the conical section (16.2) which abuts the upper piston (17).

4. An application pen in accordance with claim 1 characterized in that the seals (7, 10) have conical sealing lips (7.1, 10.1) extending in an axial direction, the openings of which are each adapted to the diameter of the lower piston (13) and the upper piston (17) and which conically taper in the direction towards the reservoir (2).

5. An application pen in accordance with claims 1 characterized in that a retarding disk (20) is fastened to the end of the upper piston (17), on which the pressure spring (19) is supported and which has axial openings (21) and which is guided on the inner wall of the housing (1).

6. An application pen in accordance with claims 1 characterized in that the upper piston (17) continues towards the interior of the reservoir (2) in the form of a shaft (22) and an actuating rod (23), which is reduced in diameter.

7. An application pen in accordance with claim 6, characterized in that the actuating rod (23) consists of a metallic material.

* * * * *